US006968188B2

(12) United States Patent
Eales et al.

(10) Patent No.: US 6,968,188 B2
(45) Date of Patent: Nov. 22, 2005

(54) DATA HANDLING SYSTEM

(75) Inventors: Michael David Eales, Bristol (GB); Dominic Desmond Phelim O'Neill, Bristol (GB)

(73) Assignee: Orange Personal Communications Services, Bristol (GB)

( * ) Notice: Subject to any disclaimer, the term of this patent is extended or adjusted under 35 U.S.C. 154(b) by 364 days.

(21) Appl. No.: 10/182,510

(22) PCT Filed: Feb. 8, 2001

(86) PCT No.: PCT/GB01/00501

§ 371 (c)(1), (2), (4) Date: Oct. 15, 2002

(87) PCT Pub. No.: WO01/60102

PCT Pub. Date: Aug. 16, 2001

(65) Prior Publication Data

US 2003/0083065 A1 May 1, 2003

(30) Foreign Application Priority Data

Feb. 9, 2000 (GB) .................................. 0002972

(51) Int. Cl.[7] .............................................. H04Q 7/20
(52) U.S. Cl. .................... 455/433; 455/424; 455/445; 709/209; 714/2; 714/13
(58) Field of Search ............................... 455/433, 445, 455/424, 560; 709/208, 223; 714/13, 2

(56) References Cited

U.S. PATENT DOCUMENTS

| 5,623,532 | A | * | 4/1997 | Houde et al. ................ 455/445 |
| 5,953,662 | A | * | 9/1999 | Lindquist et al. ............ 455/433 |
| 6,097,942 | A | * | 8/2000 | Laiho ...................... 455/414.1 |
| 6,286,042 | B1 | * | 9/2001 | Hasselberg et al. ......... 709/223 |
| 6,314,291 | B1 | * | 11/2001 | Fujimichi .................... 455/433 |
| 6,438,707 | B1 | * | 8/2002 | Ronstrom ..................... 714/13 |

FOREIGN PATENT DOCUMENTS

| WO | WO 94/23506 | 10/1994 | |
| WO | WO-94/23506 | * 10/1994 | ............ H04B 7/26 |
| WO | WO 95/26114 | 9/1995 | |
| WO | WO 98/59507 | 12/1998 | |
| WO | WO 99/35867 | 7/1999 | |

* cited by examiner

Primary Examiner—Stephen D'Agosta
(74) Attorney, Agent, or Firm—Townsend and Townsend and Crew LLP (57) ABSTRACT

In order to store data in a mobile telecommunications system, a data storage unit (HLR) has data functions (72, 74) providing data redundancy therebetween, control functions (79, 80) and signalling point (30, 31, 32) to enable the data storage unit to pass data to and from a mobile telecommunications network under the control of the control function. The control functions are physically separate from the data functions. The data functions (72, 74) may operate on the basis that one has a primary data function, a second has a primary standby function to achieve synchronised updating. The use of separate and hence distributed functions enables greater flexibility in the retrieval of data from the data storage unit (HLR).

10 Claims, 5 Drawing Sheets

DATA HANDLING SYSTEM

BACKGROUND OF THE INVENTION

1. Field of the Invention

The present invention relates to a data handling system, for example for handling data in a telecommunication system. The present invention is particularly, but not exclusively, concerned with a telecommunications system for mobile telephones.

2. Summary of the Prior Art

When a telecommunication system involves mobile telephones, a call to a mobile telephone is not to a fixed point, and therefore the system must determine the location of the destination. The simplest arrangement is for a call to a mobile telephone to result in a signal being transmitted to a data storage unit in the form of a Home Location Register unit (HLR) which determines the location of the mobile telephone, and so permits routing of the call to occur.

Inevitably, HLRs have a limited capacity, and some arrangement is therefore necessary to enable telecommunication systems to access multiple HLRs. It should be noted that it is also envisaged that users may need multiple MSISDN numbers, for example if a user is to have the possibility of both voice and data communication, in existing systems, any second MSISDN number with a common identity number (IMSI) must be a MSISDN number of the same HLR as the previous MSISDN number. This could be impossible to achieve if, for example, the HLR containing the original information is full. Then the only way that additional services could be provided would require the user to change telephone number, which would be undesirable. This becomes a particular problem if it is desirable that users are able to select their numbers, rather than be provided with them.

WO 96/11557 (corresponding to U.S. Ser. No. 08/809,767) the disclosure of which is herein incorporated by reference, proposed that the switch network which connects users to other users, HLRs, and system services, had a register unit associated therewith, which register unit contained information relating each telephone number to a corresponding one of a plurality of HLRs. The relationship between telephone numbers and HLRs should then be freely selectable within the register unit, so that the register unit acted as a converter between the number and the information identifying the HLR.

By providing such a register unit, the fixed relationship between numbers and HLRs was broken, and any number can be assigned to any HLR, assuming space permits. WO 96/11557 also proposed that the register unit stored further information associated with the mobile telephones which permits the switch network to enable calls from mobile telephones to be routed to different services, depending on the calling mobile telephone itself, in addition to the number dialled. The ideas proposed in WO 96/11557 were then developed further in WO 97/14237 by considering the location within which information is stored in the network.

When considering data in the network, there are two things that need to be taken into account. The first is the storage of the data itself, and the second is data control, being the means of handling queries, updates, results in synchronisation messages and similar controls. The arrangement described in WO 96/11557 can be considered to be of this type in that the register needs to store data, and also needs to store control information for acting on that data.

At first sight, both the data and the data control functions may be located at a single site, and stored on a single physical device such as a server which responds to queries and updates. The information stored may be considered to comprise a data function and a data control function, with the data function representing sets of data relating to respective telephone numbers, telephone control operations, etc. The data function and data control function may be considered to form a database of functions.

However, if there is only a single database that operate in this way, the network is vulnerable to failure. Therefore, WO 97/14237 proposed that the database of functions be replicated a plurality of times. Each database comprises a data function and a data control function. The replicated databases may physically be located in a single location, or may be at a plurality of physically separate locations. In either case, each replicated database may be considered to be a service data function with each such function being a notional site in the network. The sites of the functions are thus virtual sites, rather than being necessarily physically separate.

When considering such a distributed set of functions, it is important for the data functions to be synchronised and the data control functions to interwork to control the synchronisation. This synchronisation includes not only the need for the information about any particular telephone number to be the same at each function, but also for the facilities associated with that telephone number to the same at each function. WO 97/14237 therefore discussed the synchronisation of those functions.

In a telephone network, it is important that any updating of the functions is carried out in real-time, and in a synchronised way. It is not acceptable for the network to be updated gradually, as happens in existing computer database techniques.

WO 17/94237 therefore proposed that, in a network of interconnected functions each of which is to be synchronised, one of those functions was identified as a primary function, at least one other function is identified as a primary standby function, with any remaining function(s) being considered secondary. Then, when updating is needed, the primary function synchronised all other functions by signalling to them an update that it had received. Those other functions then signalled to the primary function that they had acted on the update. The primary function then signalled externally that the update has occurred, and at the same time provided acknowledgement signals to the other functions. If for any reason the primary function failed, the primary standby function may then take over control of the updating operation.

SUMMARY OF THE INVENTION

WO 97/14237 was concerned, in its examples, with distributed functions forming the register unit of WO 96/11557. The present invention then develops this idea to other elements of the network.

At its most general, the present invention proposes that a data control system has data and control functions which are separated, at least from an operational point of view, with a redundancy in both the control functions and the data functions. Within the data functions at least, one function acts as a primary function and a second as a primary standby function, and there may then be other functions as in WO 97/14237. The control function may need to store sufficient data to identify the appropriate data function for any access to that data function and may also store data which is common to all data items in the data functions.

This idea of distributed functions may be applied to the HLRs of the network in a mobile telecommunications system. Then, each HLR may be considered to have at least two control functions, and at least two pairs of data functions. Within each pair of data functions, there is redundancy so that one data function can act as a primary function and the other as a primary standby function. The data stored by the HLR is then distributed between the two pairs under control of the control functions. The control functions also control up-dating.

Preferably, there is further redundancy of the data functions, so that there are at least two triplets of data functions.

In such an arrangement, as in the ideas discussed in WO 97/14237, there may be physical distribution of the functions, since the relationships between the functions are more important than their physical locations. The different functions may be housed on different physical components, or some functions may be housed on one component and other functions on others.

In known HLRs, each time information has to be retrieved for any purpose, the processing power of the corresponding HLR is used. The processing capacity of the HLR then acts as a limit on the system. The present invention, because it separates the data function from the control function, and indeed provides redundancy, permits greater flexibility.

This provides scalability of processing on data storage, so that the network operator is no longer confined by the capacitive limits of individual HLRs. Moreover, since the data function and control function are separated, each may be upgraded independently of the other. Because of the redundancy, it may be possible to use mass produced devices, and so save cost, as compared with known arrangements. Also, since the control and data functioning may link to each other by standard interfaces, it becomes possible for external devices to access the data functions directly.

Preferably, the control function itself is divided into two functions, with one function linking to other parts of the network such as signalling transfer points (STPs), and the other sub-function linking to the data functions. The two sub-functions can then communicate with each other, but this separation then offers further advantages. In particular, the sub-function which links to the data functions may permit data to be examined without diverting processing power from the signalling carried out by the sub-function which links to other parts of the network. From the other point of view, the complexities of data handling and maintenance are separated from the sub-function which links to external components so that that sub-function can concentrate on its signalling functions.

However, the present invention is not limited to functions within an HLR. It applies to any data control system, with separated control and data functions, with redundancy at both control and data level. Preferably, there is also data separation within the data functions, so that there are at least two pairs of data functions, redundancy within each pair, and different data stored between the pairs.

For example, still in the field of mobile telecommunications, it is known that systems involving prepaid control involve a control system with data storage requirement similar to, but not with the same data as, an HLR. The present invention may then be applied to such a prepaid control system. In another example, the present invention may be used within the register unit of WO 96/11557.

The present invention is not limited to the field of mobile telecommunications. In principle, it is applicable to any data storage arrangement, particularly one in which real time data updating is needed and/or in which data validity is of high importance.

An embodiment of the present invention will now be described in detail, by way of example, with reference to the accompanying drawings, in which.

Figure 1:
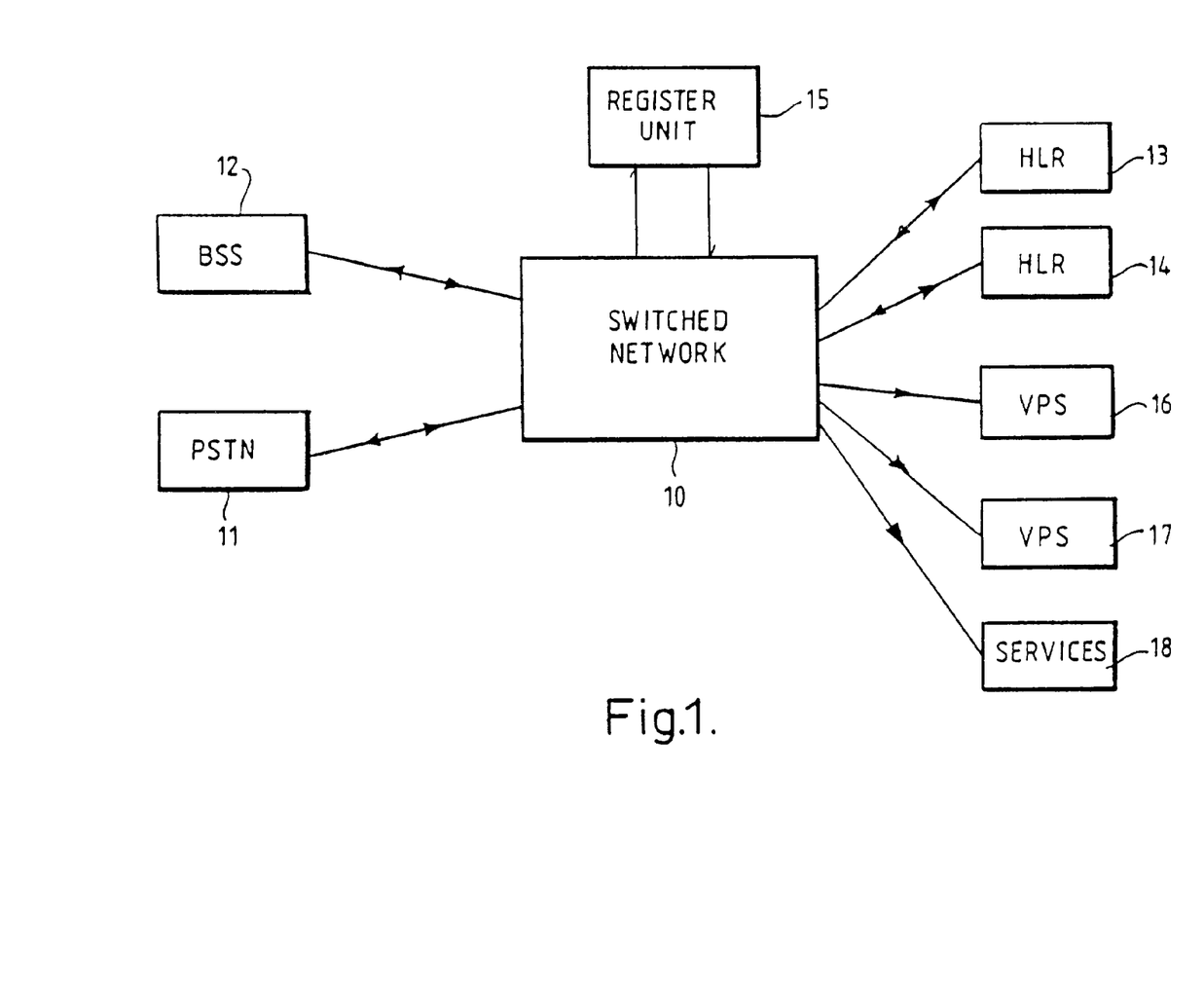
FIG. 1 is a schematic block diagram of a telecommunication system described in WO 96/11557.

Referring first to FIG. 1, and as discussed in WO 96/11557, a switched network 10 interconnects land-based and mobile telephones. If a call to a mobile telephone is made from a land-based telephone, the call is routed via the public switched telephone network (PSTN) 11 to the switch network, and from that switch network 10 to the mobile telephone (BSS) 12. To do this, the switch network 10 must determine routing information, and to determine that routing information it must determine the location of the mobile telephone 12, which it does via a HLR to which the mobile telephone 12 is associated. When there are multiple HLRs 13, 14, it is necessary for the switch network 10 to determine which HLR 13, 14 must be accessed, on the basis of the telephone number (MSISDN number) of the mobile telephone input by the originator of the call.

The switched network 10 accesses a register unit 15, which identifies the called number and addresses it to a particular HLR 13, 14 with which the mobile telephone 12 is associated. The register unit 15 permits the relationship between any given mobile telephone number and the HLRs 13, 14 to be determined freely, so that the number is unaffected by the particular HLR 13, 14 with which it is associated. The register unit 15 removes the need for a particular mobile telephone number to be associated with a fixed HLR 13, 14.

Once the particular HLR 13, 14 with which the mobile telephone 12 is associated has been identified, signalling can occur to that HLR, and information derivable therefrom, in the usual way. This information is used to "set-up" the call to the mobile telephone 12, which may then be routed to the destination telephone as is normal.

Similarly, if a call originates at the mobile telephone 12, the switch network 10 must again determine the routing of that call. If the call is to a land-based telephone, connected to the switch network 10 via the PSTN 11, then this routing can be on the basis of the telephone number of the destination telephone, in the normal way.

If a call is made from a mobile telephone 12 to one of a plurality of voice processing systems 16, 17 or to services 18 associated with the switch network using a short code (e.g. 123) the relationship between the mobile telephone 12 and the corresponding service must be determined by the register unit 15 before the switch network can determine the appropriate voice processing system 16, 17 or services 18 to be accessed.

Figure 2:
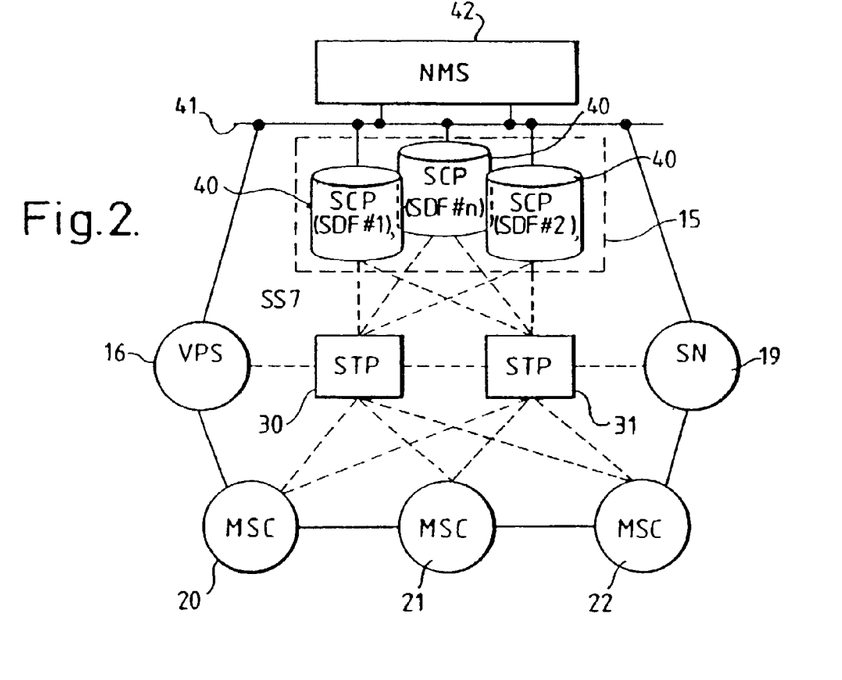
FIG. 2 shows part of the telecommunication system of as discussed in WO 97/14237

FIG. 2 shows the switch network 10 in more detail. As was discussed in WO 97/14237 the switch network has a plurality of mobile switching centres (MSC) 20, 21 and 22, and a call destined to any given mobile telephone results in signalling between that MSC 20–22 and one of a plurality of signalling transfer points (STP) 30, 31, which signal to the register unit 15 to determine the HLR 13, 14 which is appropriate to the mobile telephone 12. The register unit 15 of FIG. 1 derives that information from the telephone number (MSISDN number) of the mobile telephone 12. It would then be possible for the register unit 15 to forward the signal directly to the appropriate HLR 13, 14 but, it is preferable that the information is passed back to the corresponding STP 30, 31 which then passes the signalling to the correct HLR 13, 14.

A similar signalling flow occurs when the user of the mobile telephone 12 tries to access a voice processing system (VPS) 16 or a service node (SN) 17. The call is received by one of the MSCs 20, 21 and 22 which passes the dialled digits and the identity of the mobile telephone to one of the STPs 30, 31, 32. This relays the information to the register unit 15, which uses this information to construct the correct address of the appropriate voice processing service (VPS) 16 or service node (SN) 17. That information is relayed back from the register unit via one of the STPs 30, 31, 32 to the original MSC 20, 21, 22. This address is then used to route the call by the switch network 10. That routing passes the call from the appropriate MSC 20, 21, 22 via the switch network to the VPS 16 or the SN 17.

In the arrangement shown in FIG. 2, the register unit 15 is not a single component, but comprises a plurality of units hereinafter referred to as service control points (SCP) 40. There are N SCP 40, wherein N is an integer being 2 or greater. At least two SCP 40 are needed in order to provide a replicated database for load sharing and fault tolerance.

In the arrangement of FIG. 2, the SCPs 40 are interconnected by a data connection 41, and the system also has a controller (NMS) 42 that monitors the service control points (SCP) 40.

Figure 3:
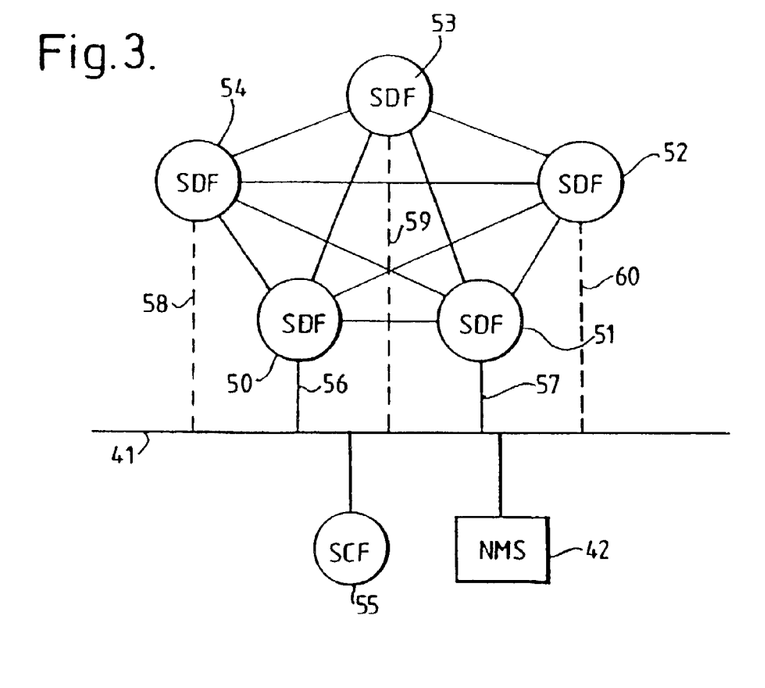
FIG. 3 shows part of the arrangement of FIG. 2, in terms of significant functional components.

FIG. 2 illustrates the arrangement of the network in structural terms. However, it is also possible to think of the arrangement in functional terms, and the significant functions of the arrangement of FIG. 2 are illustrated in FIG. 3. The SCPs 40 may, collectively, be considered as a plurality of functions, primarily data functions, which collectively provide a centralised repository for service/subscriber related data. Each of these functions will be referred to as a service data function or SDF. Thus, as shown in FIG. 3, a plurality of such functions (SDFs) 50, 51, 52, 53 and 54 are interconnected, and connected to the data connection 41. FIG. 3 also shows a service control function SCF 55 which is a logical element (in the same way as the SDFs 50–54 are logical elements) corresponding to VPS 16, service node 19 etc. in FIG. 2. The SCF 55 can be thought of as a "client" within the network which requests data from, updates to, etc the SDFs 50–54.

One of the SDFs 50 is designated a primary function, and has primary responsibility for synchronising updating of the other SDFs 51–54. The link between the SCF 55 and the data connection 41 is a path for data being retrieved by an SCF 55, and also of update information to the SDF 50.

At least one other SDF 51 is designated a primary standby function and has a similar link 57 to the connection 41. As will be discussed in more detail later, the primary standby function 51 operates to take over the control of updating carried out by the primary function 50 if the primary function 50 is unable to carry out that operation correctly. Whilst there may be more than one primary standby function, in the arrangement shown in FIG. 3, all the other SDFs 52, 53, 54 are secondary functions. Those secondary functions 52, 53, 54 are also connected by suitable connection 58, 59, 60 to the data connection 41. Those connections 58, 59, 60 are involved in retrieval of data for an SCF, synchronisation of updates from the primary function SDFs, but not directly in updating from an SCF. Instead, all the SDFs 50–54 are interconnected for updating controlled by the primary function 50, or the primary standby function 51. In fact, those interconnecting are normally via connections 56 to 60 and data connection 41, but for functional purposes may be considered to be direct as shown in FIG. 3.

In normal use, functions (SDFs) 50–54 provide a composite memory in which, in a mobile telephone system, information about users, network functions, etc may be stored as discussed in more detail in WO 96/11557.

In normal operation, a request for updating of data stored in the SDFs 50–54 is received at the primary function 50. When update information is received by the primary function 50, the primary function 50 signals the update to all other functions 51–54. When those functions 51–54 have recorded the update, they signal back to the primary function 50 that the update has been completed. Thus, the primary function 50 can store information confirming that all the other functions 51–54 have been successfully updated. The primary function 50 may then signal to the SCF 55 to confirm that the update operation has been completed, and also confirm to the other functions 51–54 that it has recorded the completion of the update and that the SCF has been notified. Thus, at all times, the functions 50–54 are synchronised.

If any secondary function 50–54 fails successfully to record an update, this will be detected by the primary function 50 and that secondary function will then be considered unsynchronised, and thus not a reliable source for data. The primary function 50 will not attempt to send further update signals to such an unsynchronised secondary function. Of course, if there are too many failures, the primary function may determine that the attempted update of the network of functions has wholly failed, in which case a suitable signal will be sent to the SCF 55, and the update operation rejected.

It is preferable that an unsynchronised secondary function can subsequently return itself to the synchronised state. An unsynchronised secondary function may signal to the primary function 50 an indication of the last update which it successfully completed. The primary function 50 may then determine all subsequent updates and transmit all those updates to the unsynchronised secondary function. If the unsynchronised secondary function successfully records all those updates, it may be considered to have returned to synchronisation. Once synchronised, the primary function 50 will continue to update that secondary function in the normal way.

Under some circumstances, the primary function 50 may need to be closed down. For example, this may be because the hardware on which the primary function 50 is resident needs to be maintained. To prevent the network of functions having to be closed down at this time, the actions of the primary function 50 are transferred to the primary standby function 51. This hand-over of operations is signalled between the primary function 50 and the primary standby function 51, and also with the SCF 55. Any existing updates should be completed before this hand-over occurs, so that all SDFs are synchronised prior to the primary standby function 51 taking over.

This procedure can also apply in an unexpected failure of the primary function 50. As has previously been mentioned, when the primary function 50 has received confirmation from all the other functions 51–54 that updating had occurred, it notifies the requesting SCF and then signals an acknowledgement to those other functions. If that acknowledgement is not received by the primary standby function 51 within a predetermined time and the primary standby function 51 is informed by the switched network 10 that the primary function is unavailable, the system may be arranged so that the primary standby function 51 then automatically takes over control of the network functions 50–54 under the assumption that the primary function is no longer available.

Simultaneous failure of one or more secondary functions does not prevent the network of functions operating successfully, and either the primary function 50 or the primary standby function 51 may fail, in combination with any of the secondary functions 52–54 and data updating and querying will still be possible. However, if both the primary function 50 and the primary standby function 51 fail at the same time, then the remaining network of functions will only be able to support data retrievals; data updating will not longer be possible. For this reason, it may be preferable to provide multiple primary standby functions, although other constraints within mobile telephone networks may prevent this.

It should be noted that although FIG. 3 illustrates an arrangement with five functions (SDFs) 50–54, the minimum number of functions to achieve the present invention is two. In such an arrangement, one function acts as a primary function, and the other acts as a primary stand-by function. Further secondary functions then increase redundancy and load sharing.

In the above description, each service control point (SCP) 40 was associated with a corresponding SDF 50 to 54. It should be noted that any single SCP 40 may act as the storage site for only the corresponding SDF 50–54, or may store other information, such as data or control operations.

The above discussion of the use of primary, primary stand-by, and secondary functions has been derived from WO 97/14237 and is included in order to illustrate the redundancies envisaged by the present invention.

An embodiment of the present invention will now be described with reference to FIG. 4, which illustrates the separation of control and data functions, and also illustrates data redundancy, within an HLR. FIG. 2 illustrated two STPs 30, 31 but in FIG. 4 there are three such STPs 30, 31, 32. A HLR may then be formed by three sets of functions 70, 71, 75. Set 70 of functions are control functions, and the sets 71, 75 are sets of data functions.

Considering first set 71 of data functions, that set comprises three functions 72, 73, 74 each of which can be considered to be a service data function (SDF) equivalent to the SDFs 52, 54 shown in FIG. 3. Since they are functions within an HLR, they will be referred to as SDF(HLR)s 72 to 74. The SDF(HLR)s 72 to 74 each carry out the function of an SDF (as previously described) and contain data necessary for an HLR.

Within the three SDF(HLR)s 72 to 74 within the set 71, one SDF(HLR) acts as a primary function, one as a primary standby function, and one as a secondary function. There is thus a level of redundancy. The terms "primary", "primary stand-by" and "secondary" are used in the same way as they were used previously with reference to the SDFs 52, 54 in FIG. 3. The actions of primary, primary stand-by, and secondary functions will therefore not be described in more detail, since they have been described previously.

Figure 4:
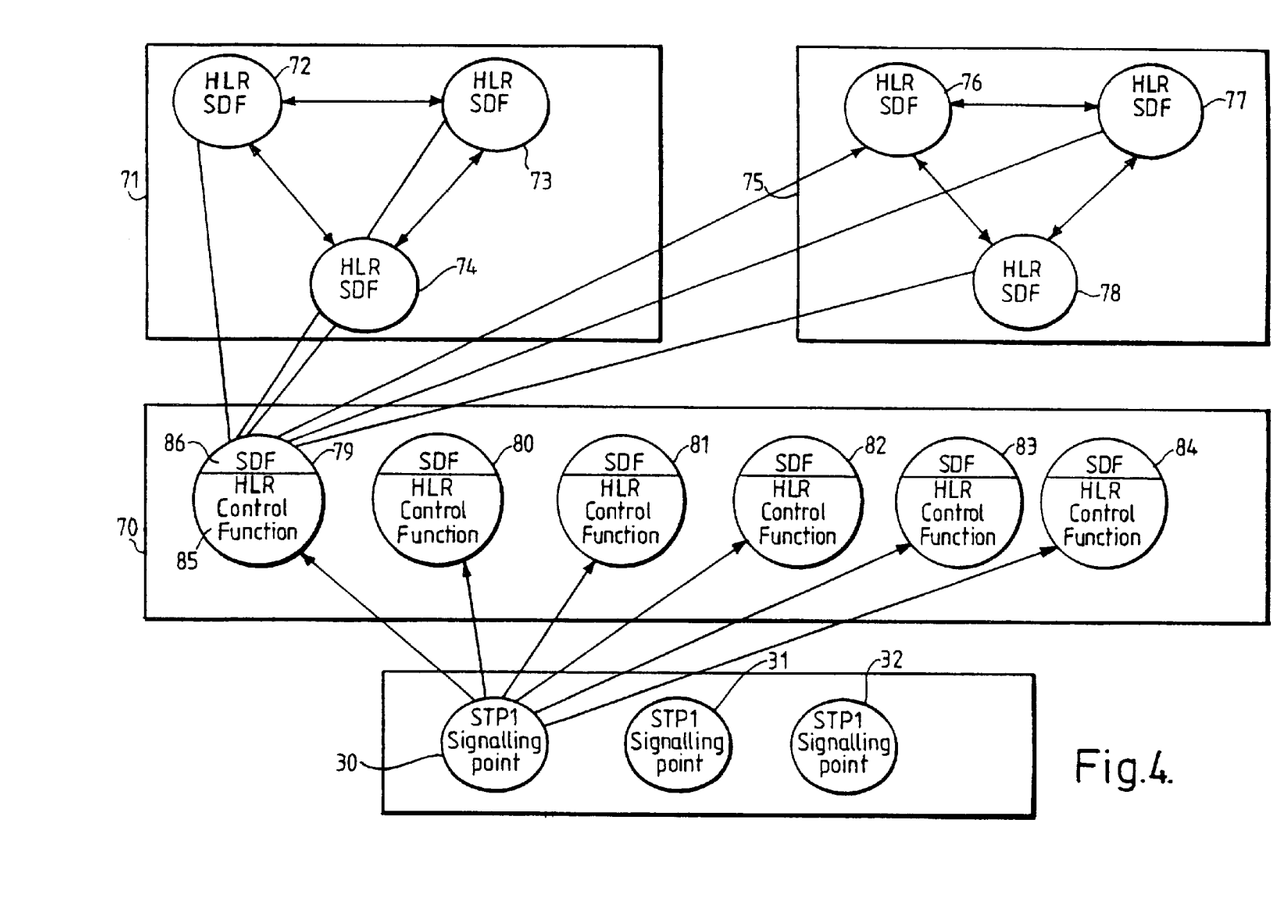
FIG. 4 shows an HLR and STPs in an arrangement embodying the present invention.

FIG. 4 shows that there is a second set 75 of SDF(HLR)s 76 to 78. These act in exactly the same way as the SDF (HLR)s 72 to 74, but store different data. The data capacity of the virtual HLR thus formed is thus determined by the number of such sets of SDF(HLR)s. FIG. 4, showing two such sets 71, 75 is the practical minimum but there may be any number of such sets.

The set 70 of functions comprises a plurality of functions 79 to 84, each of which will be referred to as an HCP. As illustrated by the HCP 79, the function of each HCP is to act as a link between an STP and the sets 71, 75 of data functions and also to execute the control logic of a known HLR. It should be noted that the STPs 30 to 32 may communicate with each HCP 79 to 84, but only the communications of STP 30 are illustrated for clarity. Similarly, the HCPs 80 to 84 communicate with each set 71, 75 but again the communication lines are not shown in FIG. 4 for the sake of clarity. Each HCP thus acts as a link between the STPs 30, 32 and the sets 71, 75 of data functions where the data required by the STPs 30 to 32 and the rest of the network are stored. For any particular data transaction, the STPs 30 to 32 selects one of the HCPs 79 to 84, using an appropriate distribution algorithm.

In this embodiment, each HCP 79 to 84 comprises two sub-functions. Referring to the HCP 79, a first sub-function HCF 85 acts as the link to the STPs 30 to 32, and a second sub-function 86 acts as the link to the sets 71, 75 of data functions. Separation of the sub-functions within each HCP 79 to 84 has the advantage of making the communication with the SDPs and the communication with the set 71, 75 of data functions substantially independent, resulting in improved processing. The sub-function 86 which links to the set 71, 75 of data functions controls the linking to the sets 71, 75 and may, for this purpose contain sufficient data to identify the appropriate set and may also contain data which is common to all sets 71, 75. For example in the context of an HLR where the data functions store subscriber information, the sub-function 86 may store data which are applicable to any or all subscribers.

In the embodiment of FIG. 4, each function, and indeed each sub-function of the HCPs, may be on a separate physical component, or sub-combinations of the functions may be distributed over multiple physical components. The result is a "virtual HLR", in that the sets of function 70, 71, 75 may be distributed in any way around a network.

In the arrangement of FIG. 4, there must be at least two HCPs, at least two sets 71, 75 of data functions, and a least two SDF(HLR)s within each set 71, 75. There may be more HCPs, more sets of data functions, and more SDF(HLR)s within each set of data functions. Triple redundancy of SDF(HLR)s, as in FIG. 4, should provided an acceptable balance between resilience and excessive redundancy.

Figure 5:
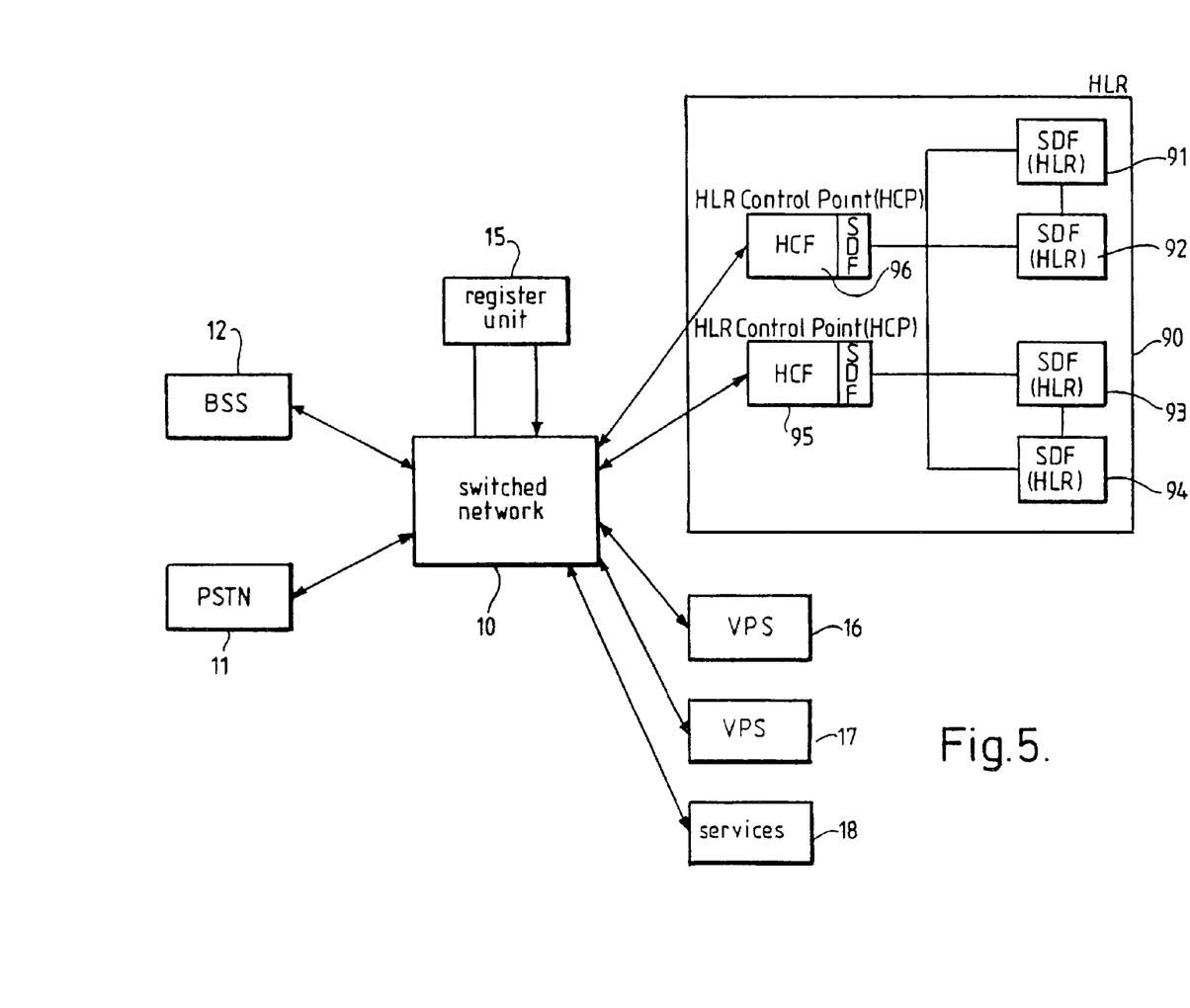
FIG. 5 shows an arrangement in which an HLR embodying the invention is incorporated into the system of FIG. 1.

FIG. 5 illustrates the combination of an HLR being an embodiment of the invention and the switched network of FIG. 1. In FIG. 5, the HLRs 13, 14 FIG. 1 are replaced by composite HLR 90 comprising two pairs of HLRSDFs 91, 92, 93, 94 controlled by two HCPs 95, 96. The HCPs 95, 96 are equivalent to the HCPs 79 to 84 in FIG. 4, the HLRSDFs 91 to 94 are equivalent to the HLRSDFs 72 to 74 and 76 to 78 in FIG. 4. As before, each HCP 95, 96 is divided into two sub-functions, one HCF function which links to the switch network and one function which links to the SDF(HLR)s. FIG. 5 illustrates the minimum levels of redundancy envisaged by the present invention.

Figure 6:
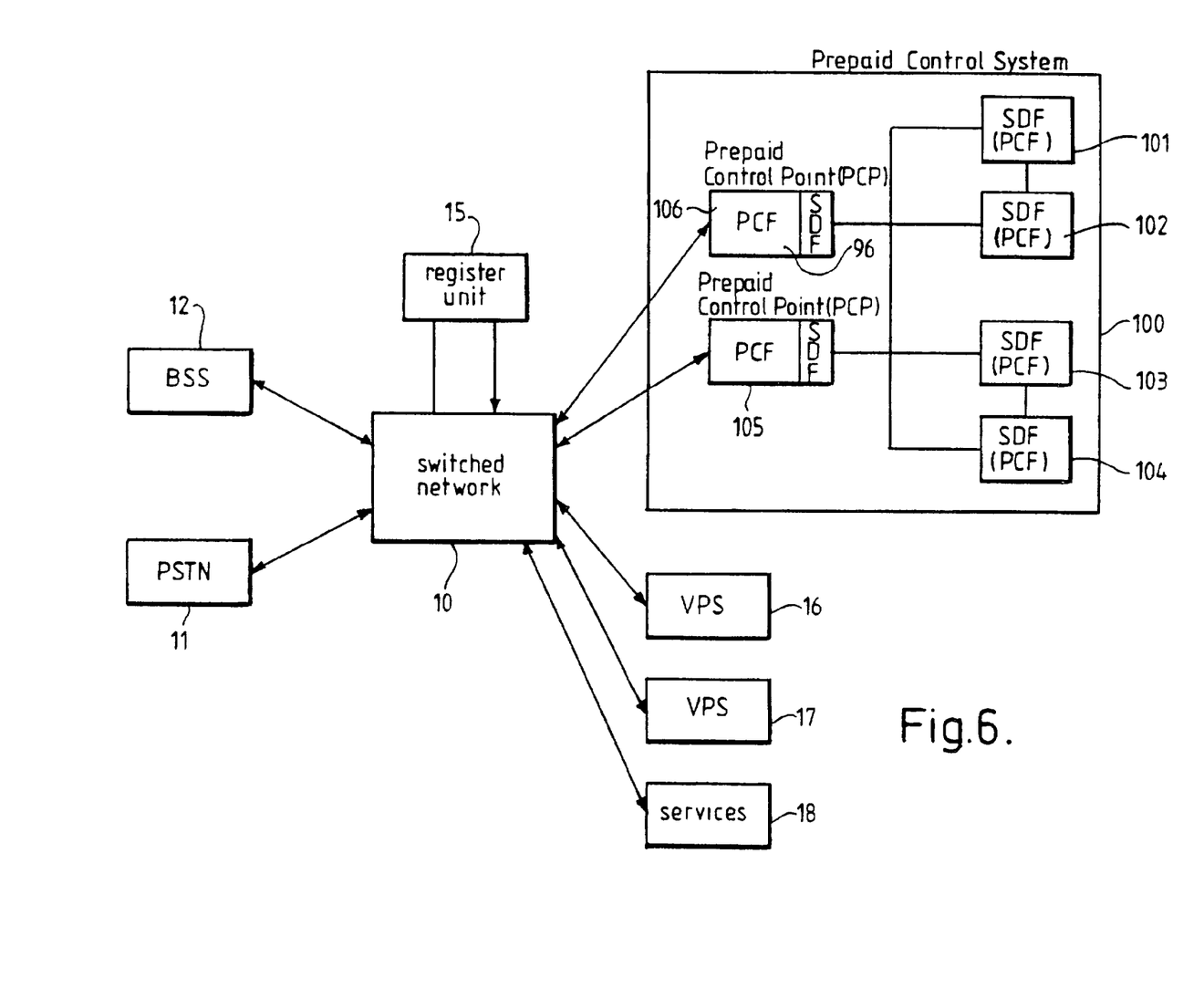
FIG. 6 shows an arrangement in which a prepaid control system embodying the invention is incorporated into the system of FIG. 1

As mentioned above, the present invention is not limited in its application to the data and control functions of an HLR. Mobile telephone systems involving pre-payment incorporate a control system which has similar data storage requirements to, but not the same data as, an HLR. FIG. 6 illustrates an embodiment in which such a control system 100 is connected to a network similar to that of FIG. 1. In FIG. 6, elements which are the same as those in FIG. 1 are indicated by the same reference numerals and are not described in more detail now.

The control system 100 of FIG. 6 is similar to the HLR 90 of FIG. 5 in that it incorporates four data functions 101, 102, 103, 104 formed into two pairs. Each of these functions will be referred to as a SDF(PCF)s. The two SDF(PCF)s 101, 102 form a pair and contain the same data, with one acting as a primary function and the other as a primary stand-by function, and contain the same data. The other two SDF (PCF)s 103, 104 are similar, but contain different data. The SDF(PCF)s are linked to the switch network 10 by two (or more) pre-paid control points (PCPs) 105, 106 which perform functions similar to the HCPs 95, 96 in FIG. 5. Each PCP 105, 106 is divided into two sub-functions as before, a PCF function which acts to link the PCP 105, 106 to the switch network 10, and the other being a SDF sub-function which links to the SDF(PCF)s 101 to 104. Thus in the embodiment of FIG. 6, there is redundancy both at the data storage level, and at the control function level since either PCP 105, 106 can access any of the SDF(PCF)s 101 to 104.

What is claimed is:

1. A data storage unit for a mobile telecommunications system comprising at least two data functions, providing data redundancy therebetween, at least two control functions, and transfer means for enabling the data storage unit to pass data to and from a mobile telecommunications network, the at least two control functions each having arranged to control the passing of data between both of said at least two data functions and said transfer means and to control updating of at least one of the data functions, wherein the at least two control functions are physically separate from the at least two data functions; wherein:

said at least two data functions comprise a first data function being a primary data function, and a second data function having a primary standby data function, the primary data function being arranged to generate signals under control of either of said two control functions for synchronized updating of all of said data functions, and the primary standby data function being arranged to generate signals under control of either of said two control functions for synchronized updating of all of said data functions in the event of a failure to said primary data function; and each of said at least two control functions comprises a first sub-function linking to said transfer means and a second sub-function linking to said at least two data functions and to said first sub-function.

2. A data storage unit according to claim 1, further including at least two further data functions providing data redundancy therebetween, the at least two control functions each being arranged to control the passing of data between both of said at least two data functions and said transfer means.

3. A data storage unit according to claim 1, wherein said transfer means comprises a plurality of transfer points each connected to each of said at least two control functions, each of said transfer points being able to pass data to and from unit mobile telecommunications network.

4. A data storage unit according to claim 1 having a home location register.

5. A mobile telecommunications system comprising a mobile telecommunications network and a data storage unit according to claim 1 linked to said mobile communications network by said transfer means.

6. A data storage unit for a mobile telecommunications system comprising at least two data functions, providing data redundancy therebetween, at least two control functions, and transfer means for enabling the data storage unit to pass data to and from a mobile telecommunications network, the at least two control functions each having arranged to control the passing of data between both of said at least two data functions and said transfer means and to control updating of at least one of the data functions, wherein the at least two control functions are physically separate from the at least two data functions, functions; wherein:

said at least two data functions comprise a first data function being a primary data function, and a second data function having a primary standby data function, the primary data function being arranged to generate signals under control of either of said two control functions for synchronized updating of all of said data functions, and the primary standby data function being arranged to generate signals under control of either of said two control functions for synchronized updating of all of said data functions in the event of a failure to said primary data function; and said transfer means comprises a plurality of transfer points each connected to each of said at least two control functions, each of said transfer points being able to pass data to and from unit mobile telecommunications network.

7. A data storage unit according to claim 6, further including at least two further data functions providing data redundancy therebetween, the at least two control functions each being arranged to control the passing of data between both of said at least two data functions and said transfer means.

8. A data storage unit according to claim 6, wherein each of said at least two control functions comprises a first sub-function linking to said transfer means and a second sub-function linking to said at least two data functions and to said first sub-function.

9. A data storage unit according to claim 6 having a home location register.

10. A mobile telecommunications system comprising a mobile telecommunications network and a data storage unit according to claim 6 linked to said mobile communications network by said transfer means.

* * * * *

UNITED STATES PATENT AND TRADEMARK OFFICE
CERTIFICATE OF CORRECTION

PATENT NO. : 6,968,188 B2
APPLICATION NO. : 10/182510
DATED : November 22, 2005
INVENTOR(S) : Michael David Eales and Dominic Desmond Phelim O'Neill It is certified that error appears in the above-identified patent and that said Letters Patent is hereby corrected as shown below:

Column 10,
Lines 19-21, should read -- wherein the at least two control functions are physically separate from the at least two data functions, wherein: --.

Signed and Sealed this

Twenty-seventh Day of June, 2006

JON W. DUDAS
*Director of the United States Patent and Trademark Office*